Figures 1A, 1B:
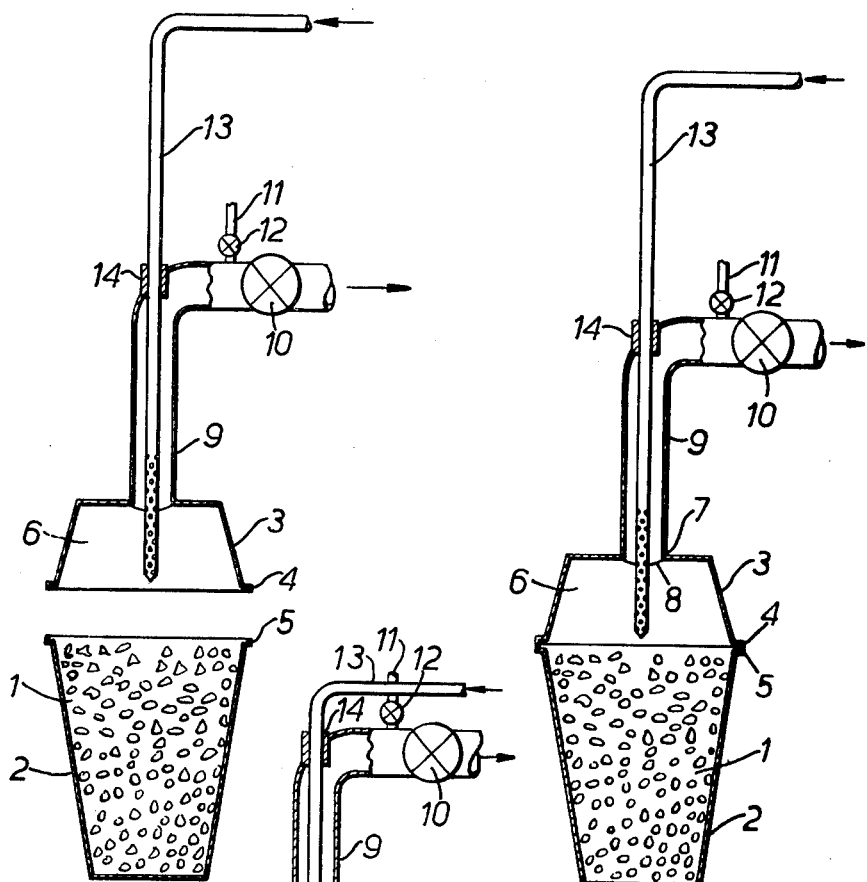

United States Patent [19]

Janovtchik

[11] 4,148,933
[45] Apr. 10, 1979

[54] PRESERVING FOOD PRODUCTS

[75] Inventor: Viacheslav J. Janovtchik, London, England

[73] Assignee: In. Da. Te. Aktiengesellschaft, Eschen, Liechtenstein

[21] Appl. No.: 829,104

[22] Filed: Aug. 30, 1977

[30] Foreign Application Priority Data

Aug. 31, 1976 [GB] United Kingdom .............. 35988/76

[51] Int. Cl.² .................. A23B 7/00; A23L 2/16; A23P 1/00
[52] U.S. Cl. ...................................... 426/402; 53/407; 53/408; 53/432; 426/506; 426/511; 425/521
[58] Field of Search ............... 426/511, 506, 521, 522, 426/399, 402, 531, 407; 99/483, 516, 517, 371, 275, 293, 300, 288; 53/11, 86, 21 FC; 141/70, 64, 48; 21/2, 56, 93, 94, 95, 96, 97, 98, 78

[56] References Cited

U.S. PATENT DOCUMENTS

| | | | |
|---|---|---|---|
| 1,639,828 | 8/1927 | Wheeler et al. | 426/511 |
| 1,714,597 | 5/1929 | Grindrod | 426/522 X |
| 1,928,903 | 10/1933 | Manning | 99/516 |
| 1,940,013 | 12/1933 | Petersen | 426/521 X |
| 2,477,692 | 8/1949 | Grindrod | 53/11 X |
| 3,332,788 | 7/1967 | Barnby | 426/399 |
| 3,436,170 | 4/1969 | Lodge | 21/56 |
| 3,486,295 | 12/1969 | Rausing et al. | 53/11 X |
| 3,939,287 | 2/1976 | Orwig et al. | 99/516 X |
| 4,059,919 | 11/1977 | Green | 426/521 X |

Primary Examiner—Kenneth M. Schor
Attorney, Agent, or Firm—Sughrue, Rothwell, Mion, Zinn and Macpeak

[57] ABSTRACT

A food product, such as fruit or vegetables either whole or in pieces, or in the form of a pulp, or meat in pieces, is preserved by feeding hot liquid or steam into a contained body of the product to sterilize the product. Some liquid is retained in the product which is sealed in a container under aseptic conditions. The sterilization preferably takes place in the container in which the sterile product is ultimately sealed.

7 Claims, 7 Drawing Figures

PRESERVING FOOD PRODUCTS

This invention relates to the preservation of food products and more especially to the preservation in large containers of food products in pieces or in the form of a liquid or concentrated pulp.

The food products may be whole pieces of fruit or vegetables, for example, tomatoes, apricots, potatoes, mushrooms, carrots, onions and other fruit and vegetables. The food product may be fruit or vegetables or other food products such as meat cut into smaller pieces. The food products are preserved mixed with water, their own juices, or with other liquids. Food products preserved in their own juice may be in the form of a liquid or concentrated pulp, for example tomato paste.

The preservation of fruits and vegetables in cans for later consumption is usually effected by placing into cans of small capacity, for example from 0.5 liters to 3 liters in volume, a quantity of the product with a small amount of water, its own juice, or other liquid. The cans are sealed and then sterilized and cooled. This process may be continuous or discontinuous.

This usual method of preservation in which the food product is sterilized, and may even be cooked while sealed inside the can, takes a long time and the quality of the product may be impaired and its colour and flavour may deteriorate during the sterilization process.

The preservation of food products in large containers offers considerable difficulties and hazards with regard to the quality of the product because no efficient and economical equipment is available.

It is an object of the present invention to provide a method and apparatus for the preservation of food products, for example, whole fruit and vegetables or fruit and vegetables cut into smaller pieces, in large containers with little impairement of the original quality of the products.

A further object of the invention is to provide a method for preserving food products in large quantities, which is more economical than methods employed hereto.

According to the invention a method of preserving a food product comprises feeding hot liquid or steam into a contained body of the product under aseptic conditions and at a temperature sufficient to sterilize the product, cooling the sterile product, retaining a predetermined amount of liquid in admixture with the sterile product, sealing the sterile product and the predetermined amount of liquid in a container, and maintaining aseptic conditions throughout.

Preferably, the hot liquid or steam is fed into the bottom of the contained body of the product.

In one way of carrying out the invention the body of the product is placed in the container in which it is ultimately sealed, and the product is sterilized in that container.

The product may already be in the container when sterilization takes place, and preferably the method comprises feeding the hot liquid or steam into the product by capping the container with a cover, lowering an injector tube through the cover into the product in the container, feeding the hot liquid or steam through the tube into the bottom of the container, and when the product in the container is sterile and cooled, withdrawing the cover and tube and sealing the container.

Preferably, the method further comprises the steps of placing the container containing the product in a sealed chamber, capping the container with said cover, admitting steam into the sealed chamber to engender sterile conditions therein, lowering the injector tube through the cover into the product in the container, injecting hot liquid or steam to sterilize the product, cooling the product aseptically inside the container to produce a required mixture of the product and liquid in the container, withdrawing the injector tube and the cover, sealing the container in the sterile chamber, and then opening the chamber to remove the sealed container of sterile product.

The invention also comprehends a method of preserving a food product, comprising feeding the product to be sterilized into a chamber, sealing the chamber, feeding the hot liquid or steam into the sealed chamber to sterilize the product, cooling the product, transferring the cooled sterile product and the predetermined amount of liquid from the chamber into a sterile transportable container within a closed sterile space, and sealing the product in the container.

In another embodiment the method of the invention comprises feeding the product into a funnel-shaped part of the chamber, sterilizing the product in that funnel-shaped part, placing a sterile container inside a closed sterile space below the chamber, raising the container to enclose said funnel-shaped part of the chamber after cooling of the sterilized product in the chamber, opening an outlet from the chamber, lowering the container progressively as the sterile product/liquid mixture transfers slowly through the funnel-shaped part into the container without damage to the sterile product, and sealing the container under aseptic conditions when it is full.

The chamber may be an autoclave in which a drum for containing the product is rotatably mounted, the inside of the autoclave, the drum and the product within the drum being sterilized by feeding hot liquid or steam into the autoclave.

The drum may be perforated and steam under pressure is fed into the autoclave.

Hot liquid or steam may be fed into the drum to sterilize the product.

This method may further comprise aligning an outlet from the drum with an outlet in the lower part of the autoclave, placing a sterile container inside a closed sterile space below the autoclave, raising the container to enclose the outlet of the autoclave after cooling of the sterilized product in the drum, opening the aligned outlets of the drum and the autoclave to transfer the sterile product/liquid mixture into the container, lowering the container when full, and then sealing the container under aseptic conditions.

Further the invention may include flash cooling the sterile product by exhausting hot liquid or steam therefrom.

The invention further provides apparatus for preserving a food product, comprising a sealable chamber having an upper part and a lower part which parts are relatively movable to open and close the chamber, the lower part being shaped to hold a container for the food product, means for effecting relative movement of said parts, an inlet into the chamber for sterilizing hot liquid or steam, and means within the chamber for capping and sealing the container.

The apparatus may include a movable injector tube for sterilizing hot liquid or steam for immersing in the food product when the chamber is closed.

One embodiment of the apparatus comprises a cover for the container mounted in the upper part of the chamber, and means for lowering the cover into sealing engagement with the container when the chamber is closed, and wherein the injector tube extends through the cover for lowering into the food product in the container.

Preferably the upper part of the chamber is fixed and the lower part is movable vertically to open and close the chamber.

In this preferred embodiment the upper part of the chamber has a floor with a central aperture which just permits passage of the mouth of a container held in the lower part, the lower part of the chamber has a shape matching that of the container which it holds and has at its upper edge means to engage with locking means around the central aperture whereby the chamber is sealed, and the lower part is supported by hydraulic means operable to move the lower part up to and down from the central aperture.

The apparatus may also include a support table for the container in the lower part which table is mounted on a rigid column which passes through a sealing gland in the bottom of the lower part, whereby the lower part is moved around the container as the lower part is raised into sealing engagement with the central aperture in the floor of the upper part, and the sealed container is accessible on the table when the lower part is lowered.

In another embodiment of the invention the upper part of the chamber is divided into upper and lower compartments by a partition wall having a sealable outlet, each compartment has an inlet for sterilizing hot liquid or steam, the upper compartment has an inlet for the food product, an injector tube for sterilizing hot liquid or steam extends into the upper compartment, and the lower part of the chamber is adapted to raise the container to the sealable outlet in the partition wall when the chamber is sealed.

Preferably the partition wall is funnel-shaped with said sealable outlet at the bottom of the funnel, which funnel is shaped to permit the container to fit around the funnel.

In a further embodiment of the invention the upper part of the chamber is divided into upper and lower compartments, the upper compartment is an autoclave having an inlet for sterilizing hot liquid or steam and a valved outlet at the bottom of the autoclave, a rotatable perforated drum for holding the food product as it is sterilized is mounted in the autoclave and has a valved opening for releasing sterile product into the autoclave, and the lower part of the chamber is adapted to raise a container for the sterile product to the valved outlet at the bottom of the autoclave.

The invention also comprehends a capped and sealed container of food product produced by a method of the invention.

Figure 1C:
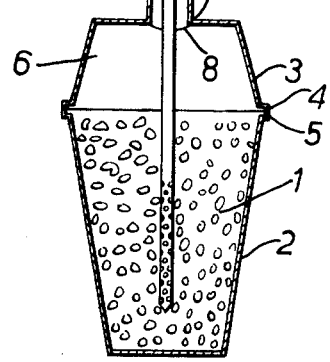
Figure 2:
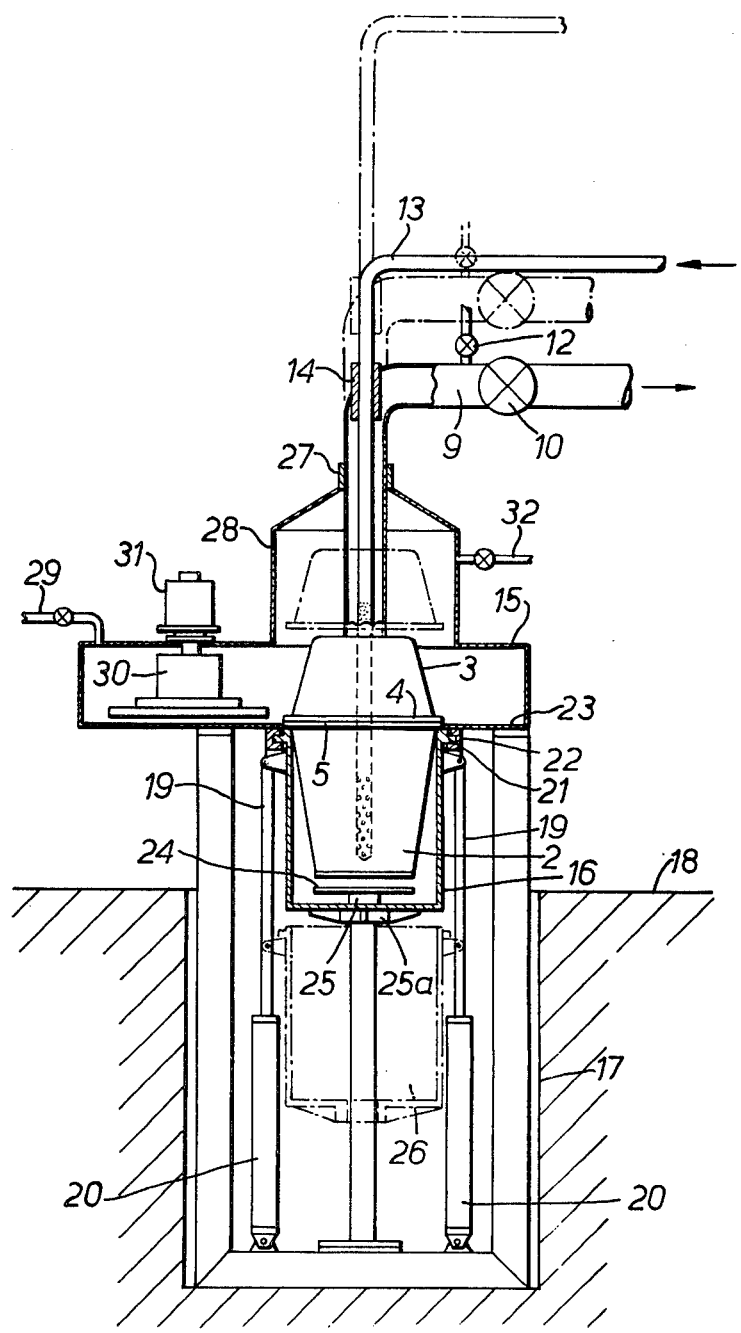
Figure 3:
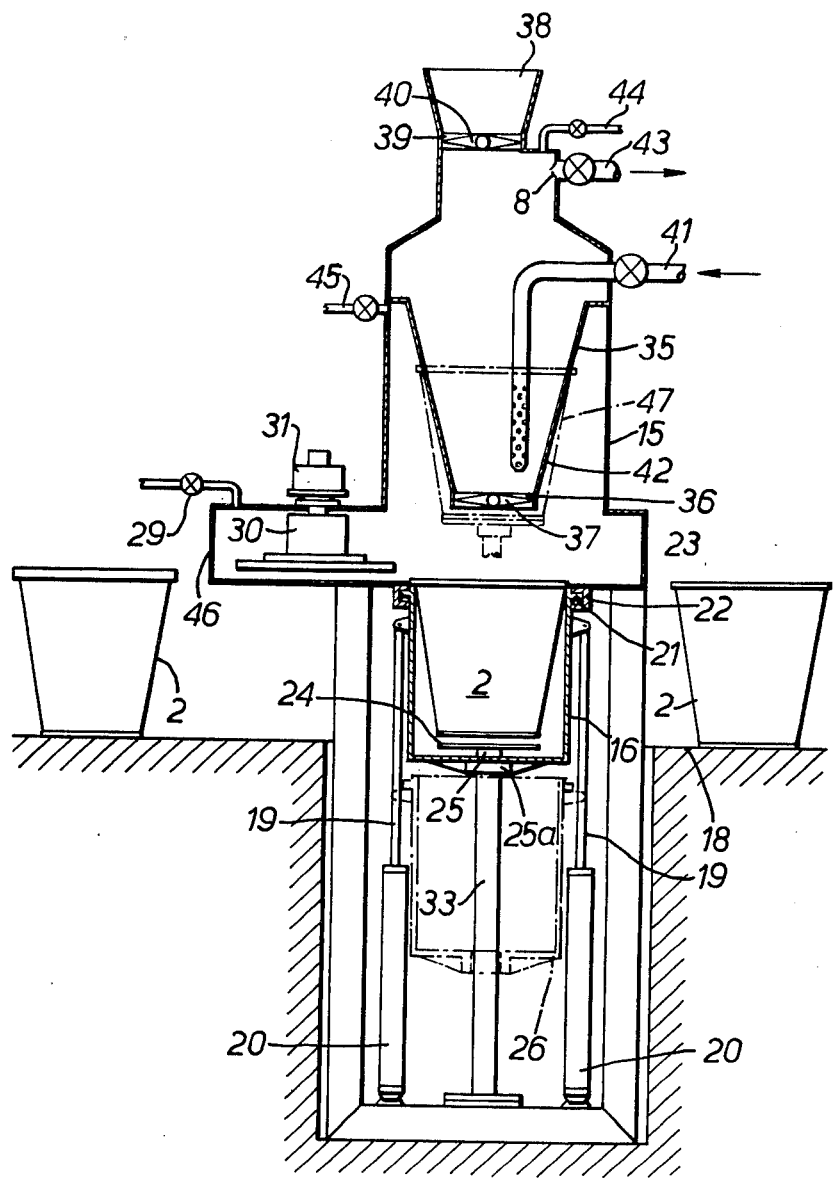
Figure 4:
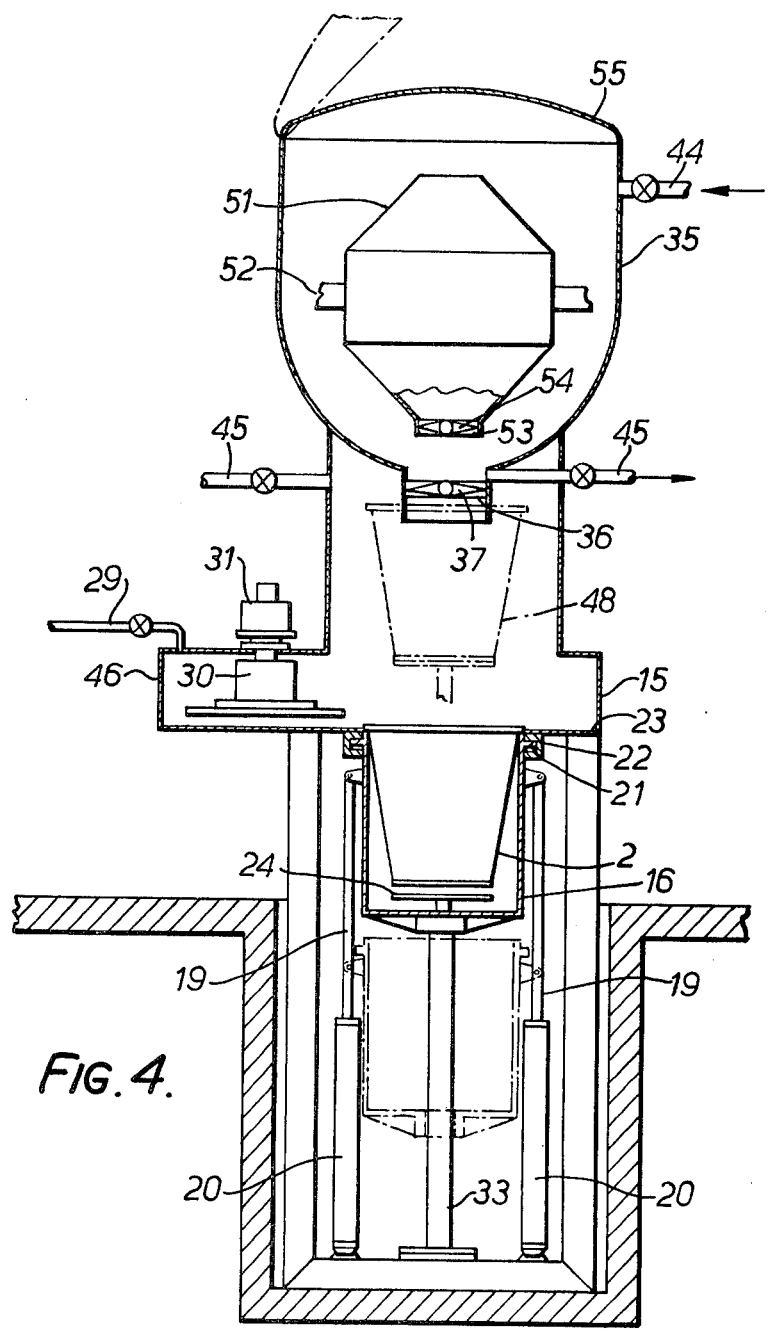
Figure 5:
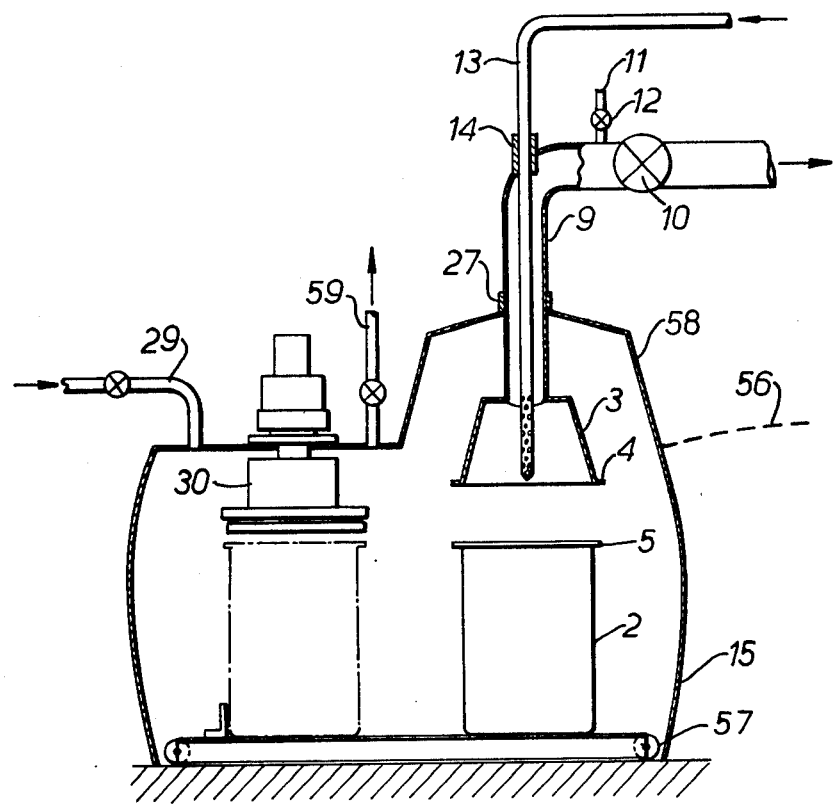

In order that the invention may be more clearly understood some embodiments thereof will now be described, by way of example, with reference to the accompanying drawings in which:

FIGS. 1a, 1b, and 1c together illustrate diagrammatically the sterilization of food products in a container according to the invention, FIG. 2 illustrates one practical form of apparatus for carrying out the method illustrated diagrammatically in FIGS. 1a, 1b and 1c, FIG. 3 is a diagrammatic sectional elevation through another embodiment of apparatus according to the invention in which the food product is sterilized in a separate chamber prior to being transferred into sterile containers in which the product is sealed, FIG. 4 is a view similar to FIG. 3 of another embodiment of the invention in which a food product is rotated in a drum as it is sterilized, and FIG. 5 illustrates yet another embodiment of the invention in which the general principle illustrated in FIGS. 1a, 1b and 1c, is utilised.

Referring to FIGS. 1a, 1b and 1c of the drawings a large body of a food product to be processed is indicated at 1. This may be for example 100 kilograms of fruit or vegetables, for example tomatoes, apricots, potatoes, mushrooms, carrots or onions, whole or cut into pieces. This large body of food product is placed in a container 2 of frusto-conical form or cylindrical form, for example of volume 180 liters. The container may be for example a frusto-conical container of the kind described in co-pending U.S. Pat. No. 651,016. Such containers have a specially shaped rim into which a sealing lid is locked by a capping apparatus as described in the above mentioned co-pending application. The cylindrical container which is sealed by a lid, may be of the type known as a Rheem container.

In FIG. 1a which illustrates the broad principles of the invention in diagrammatic form, a cover 3 for the container 2 has a lower flange 4 which fits exactly on to the rim 5 of the container 2 and can be sealed to the rim. The cover 3 defines a headspace 6 which, as illustrated in FIG. 1b, exists over the food product 1 in the container when the lower flange of the cover 3 is in sealing engagement with the rim 5 of the container 2.

The volume of the headspace 6 in the cover may be for example 30 liters.

An outlet aperture 7 in the centre of the top of the cover 3, is covered by a sieve 8 and communicates with an outlet duct 9 which is closed by a valve 10. The aperture 7 may be at the side of the top of the cover 3. A steam injection pipe 11 with a valve 12 is provided on the duct 9.

An injector tube 13 extends downwardly into the duct 9 through a sealing gland 14 and through the sieve 8, which has an appropriate aperture fitting closely around the tube 13. The injector tube 13 may be inserted through a sealing gland in a separate aperture in the cover 3. Means are provided for lowering the injector tube 13 into the product 2 in the container and subsequently withdrawing the tube from the product. When the cover 3 is sealed on to the container the tube 13 is in its withdrawn position as illustrated in FIG. 1b. The lower end of the tube 13 is perforated and hot liquid or steam is admitted into the food product through these perforations.

The cover 3 is sealed onto the top of the container 2 as shown in FIG. 1b, the steam valve 12 being closed. The injector tube 13 is lowered downwardly into the food product in the container until it is located near to the bottom of the container, that is in the region of the bottom of the body of food product in the container. The valve 10 is opened and hot liquid in which the food product 1 is to be preserved is pumped through the injector tube 13 into the bottom of the container and out through the pipe 9 and the valve 10. The upward circulation of the liquid which is thus created within the food product, which is whole or in pieces, fluidises the product so that the product which is moving freely within the liquid now completely fills both the container 2 and the headspace within the cover 3 as illustrated in FIG. 1c. The sieve 8 prevents escape of the food product from the cover. The upward circulation of the hot liquid within the fluidised food product ensures efficient heat exchange between the hot liquid and the product which is sterilized in the shortest possible time. The hot liquid is then cooled aseptically in order to cool the product by forced circulation of the cooled liquid through the product in the container.

After the cooling of the product, the excess of liquid is withdrawn from the container 2 by closing the valve 10 and admitting steam through the valve 12 of the pipe 11. The steam pressure pushes the liquid down in the cover 3 and out through the injector tube 13, until the liquid reaches the required level in the container. In another way of operating the injector tube 13 is connected to an exhaust system including an exhaust pump, which sucks out a required quantity of liquid. When the excess liquid has been removed the injector tube 13 is lifted and the cover 3 is disengaged from the container 2. The container now holds the sterilized and cooled food product in the correct proportion with liquid, and the container is sealed hermetically by a lid.

In a modification of this process instead of using a hot liquid for sterilization, steam may be injected through the tube 13 to heat and sterilize the food product. The subsequent cooling of the product may be carried out by the application of an exhaust system, the so-called "flash-cooling" system.

The sealing of the container must be done under aseptic conditions and the whole process is therefore carried out in an aseptic atmosphere. In the apparatus illustrated in FIG. 2 the whole process is carried out in a sealable chamber.

The apparatus comprises a sealable chamber having an upper, fixed part 15 and a lower part 16 which is mobile and can be lowered into and raised from the pit 17, which is sunk beneath the floor level 18, by means of piston rods 19 sliding in cylinders 20 which extend upwardly from the floor of the pit 17.

The mobile part 16 can be sealed hermetically to the fixed part 15 by means of the annular flange 21 which extends around the top of the part 16 and engages in a locking ring 22 which extends around a central aperture in a floor 23 of the fixed part 15.

Within the mobile part 16 is a central table 24 mounted on the upper end of a rigid column 25 which passes through a sealing gland 25a in the bottom of the mobile part 16, which allows the part 16 to slide relative to and around the column 25.

Retraction of the piston rods 19 into the cylinders 20 lowers the mobile part 16 to the position indicated at 26. The top of the part 16 is then below floor level 18 and a container 2 filled with food product in pieces is placed on the central table 24 which remains level with the floor 18.

The piston rods 19 are then actuated to raise the mobile part 16 to a position in which the annular flange 21 engages in the locking ring 22 of the floor 23 of the chamber 15.

Inside the duct 9 there is the injector tube 13 which can be moved down and up through the sealing gland 14 within the duct 9. The duct 9 can itself be moved down and up through a sealing gland 27 carried by an upward extension 28 of the part 15. The lower end of the duct 9 is connected to the cover 3.

When the mobile part 16 holding the container 2 with food product in pieces, is locked to the floor 23, the duct 9 is lowered and the cover 3 is in sealing contact with the container 2, by means of the ring 4 on the cover and the rim 5 of the container 2.

The injector tube 13 is then lowered into the container 2 in the manner illustrated in FIG. 1c and the sterilization process just described is carried out.

At the same time a valved pipe 29 connected to the part 15 is opened and the chamber with all its contents is sterilized by steam.

In the part 15 there is a capping device 30 of the kind described in the above mentioned co-pending patent application.

The device 30 can be swung round by means of a revolving head 31 to a position above the container 2. The device holds a lid which fits the container 2 exactly.

When sterilization and cooling of the food product is complete, the cover 3 is disengaged and is raised with the duct 9 to its initial position, freeing the container 2 of sterile product which is now within a aseptic space.

The revolving head 31 moves the capping device 30 to its position above the container 2. The device then places a lid on the container and presses it down to seal the container hermetically.

The head 31 and the capping device 30 are then returned to their initial position.

The valved tube 29 is closed and the steam pressure inside the chamber is released through a valved pipe 32.

The mobile part 16 can now be unlocked from the part 15 and the piston rods 19 are retracted into the cylinders 20 lowering the part 16 again in a position indicated at 26 within pit 17.

The sealed container 2 holding sterile and cooled food product can now be removed from the table 24 and the apparatus is ready for the next operation.

Another apparatus for carrying out the invention is illustrated in FIG. 3. In this embodiment a body of the food product to be sterilized and sealed in a container is sterilized and cooled in a separate compartment before being fed into the container. The apparatus has a sealable chamber having an upper fixed part 15 and a lower mobile part 16 for raising and lowering a container to be filled as it was described with reference to FIG. 2. The part 16 is sunk in the pit beneath floor level 18 and is connected to piston rods 19 which slide in vertically arranged cylinders 20 which extend upwardly from the floor of the pit. Within the mobile part 16 is the central table 24 mounted on the upper end of the mobile column 25 which passes through the sealing gland 25a and can be moved up and down by means of a piston inside a cylinder 33.

Retraction of the piston rods 19 into the cylinders 20 lowers the part 16 to the position indicated at 26 in the same way as described with reference to FIG. 2. The top of the part 16 is then below floor level 18 and an empty container 2 is placed on the central table 24. The cylinders 20 are then actuated to raise the part 16 upwardly to a position in which the annular flange 21 which extends around the top of the part 16 engages in the locking ring 22 which extends around a central aperture in a floor 23.

The fixed part 15 is divided into two compartments by a downwardly descending funnel-shaped wall 35 and a container can be raised upwardly to fit over the funnelled wall 35. This wall has a sealed lower outlet 36 closed by a butterfly valve 37. At the top of the fixed part 15 there is a feed hopper 38 for the food product and an inlet 39 from the hopper 38 into the part 15 is closed by a further butterfly valve 40. An injector tube 41 for hot liquid or steam extends through the wall of the part 15 and downwardly into the funnel-shaped compartment 35 and terminates at 42 near the outlet 36. An extract duct 43 is connected to the part 15 near to the inlet 39 and there is a valved steam feed pipe 44 also communicating with the top of the part 15. A further valved steam inlet pipe 45 leads to the fixed part beneath the wall 35.

In a sideways extension 46 of the part 15 the capping apparatus 30 is housed.

The processing operation is carried out at follows.

The moving part 16 is lowered to the position 26 and a large and empty container 2 is placed in position on the table 24.

The part 16 is then lifted and is attached hermetically by the joint 22, 23 to the part 15.

The part 15, the part 16 with the empty container 2 and the whole internal contents of the part 15 are sterilized by steam injected through the valved pipe 29.

At the same time, a body of the food product to be sterilized is fed through the hopper 38 and the opened valve 40 into the upper compartment of the fixed part 15, the butterfly valve 37 being closed. When the body of food product is within the funnel-shaped compartment 35 the valve 40 is closed. The food product fills the funnel-shaped compartment 35 to a level well above the bottom 42 of the injector tube 41, and hot liquid at a temperature to sterilize the product is then circulated via the injector tube 41 and oulet pipe 43. When the food product has been sterilized and cooled as described above, excess processing liquid is expelled through the duct 41 by means of steam under pressure admitted through the valved pipe 44. Alternatively the excess of liquid may be withdrawn by an exhaust system having an exhaust pump connected to the duct 41.

At this stage the funnel-shaped compartment 35 contains the sterile and cooled product mixed in the desired proportion with the filling liquid.

While the sterilization of the body of product is being effected, the column 25 is raised to lift the previously sterilized container 2 until it is positioned around the funnel-shaped part 35 as indicated at 47.

The butterfly valve 37 is opened slowly and the sterile and cooled food product transfers slowly into the container which is progressively lowered by lowering of the column 25 by means of the piston inside the cylinder 33 so that the transfer of the product takes place without damage to the sterile product which may have become somewhat softened during the sterilization process.

This is especially important when the food product is whole fruit whose appearance is to be preserved.

Lowering of the filled container continues back into the part 16 until the top of the container is level with the floor 23. The capping apparatus 30 holding a lid is then pivoted across and the lid is placed on and pressed into sealing engagement with the rim of the container. Steam injection is stopped by closing the valved tube 29 and the pressure in the part 15 is released by opening the valved pipe 45. The part 16 is lowered to the position 26 and the sealed container full of sterile and cool product is removed.

The plant is ready for another operation and as soon as the cool sterile product has been transfered into the container 2 and the valve 37 has been closed, the next body of food product to be processed can be inserted into the chamber 35 through the hopper 38 and sterilization of that body can commence while the previously filled container is still being lowered, sealed, and removed from the lower part of the aseptic chamber. There is thus little time delay in the processing cycle which proceeds at an economic rate.

The apparatus of FIG. 3 may be employed for the filling of containers with food product in the form of a liquid pulp or concentrated pulp. The upper compartment 35 is first sterilized by steam admitted through the pipe 44 with the valves 37 and 40 closed. A pulp or concentrated pulped food product for example concentrated tomato pulp which has already been sterilized then cooled using conventional apparatus is then pumped into the compartment 37 through the injector tube 41. When a batch of the product has been pumped into the compartment 35 the valve 37 is opened and the product is discharged into the container 2 which has already been raised around the funnel-shaped compartment as already described.

Similarly the apparatus of FIG. 2 may be employed for the filling of a container with a food product in the form of a liquid or concentrated pulp. The upper fixed part 15, the cap 3, the tubes 9 and 13 and the empty container 16 are first sterilized by steam injected through the pipes 29 and 32. The pump or concentrated pulp, for example concentrated tomato paste, which has already been sterilized and then cooled using conventional equipment, is pumped direct through the injector tube 13 which is in its lowered position as illustrated, until the container is filled up to the required level. The full container is then closed and sealed by the capping device 30 as already described.

FIG. 4 illustrates a modification of the apparatus of FIG. 3 in which the upper fixed part 15 of the aseptic chamber is divided into two compartments, the upper compartment 35 being shaped as an autoclave in which a revolving drum 51, which may be perforated or imperforate, is mounted on a shaft 52. The drum 51 has one opening 53 which is closed by a butterfly valve 54, which can be opened from outside the retort without opening the retort. The retort 35 has a hinged lid 55 which can be opened to admit product to be processed. The drum 51 is turned so that the opening 53 is uppermost and with the cover 55 open and the butterfly valve 54 open a body of food product is placed inside the drum. The drum is then closed by closing the valve 54. The cover 55 is sealed down and the drum is revolved to achieve a desired degree of mixing of the product and/or interaction between constitutents of the product.

Steam under pressure is admitted through the pipe 44 to sterilize the inside of the retort, and, if the drum 51 is perforated, all its contents. Steam or heating and/or cooling liquid is circulated through the retort by means of the inlet pipe 44 and outlet pipe 45. If the drum 51 is unperforated, tubing (not shown) is provided to feed the steam into and out of the drum 51 to sterilize the contents thereof.

Meanwhile an empty and sterile container is raised into position 48 in the manner described with reference to FIG. 3 and when sterilization and cooling of the product is complete the drum 51 is stopped with its opening 53 at the bottom and the valve 37 at the bottom of the autoclave 35 is opened. The valve 54 is then opened so that the mixed sterile product is discharged from the drum 51 into the container. When the container is full the valves 37 and 54 are closed. The autoclave can then be opened for loading of the next body of product when the drum has been rotated so that the opening 53 is uppermost. The filled container is lowered as described with reference to FIG. 3, and then is capped in the lower part of the chamber which is still sealed and aseptic. The pressure inside the chamber is released by opening the pipe 45 and the mobile part 16 is lowered. The container with sterile and cool food product is removed and the plant is ready for another operation.

FIG. 5 illustrates another embodiment of the invention. This apparatus comprises an aseptic chamber 15 having an inlet and outlet door whose open position is indicated diagrammatically at 56. A cylindrical container 2 of known design is filled with the food product and is placed on a conveyor 57 in the chamber 15 through the door 56 which is then sealed. The food container 2 stands on the conveyor 57 beneath a cover 3 which is mounted in a recess 58 in the roof of the chamber. A valved steam inlet pipe 29 communicates with the chamber and there is a valved outlet pipe 59 through which the steam pressurein the chamber can be released. In the chamber 15 there is a capping device 30 by means of which a lid can be placed on and sealed onto the container 2.

The duct 9 connected to the cover 3 extends through a sealing gland 27 in the recessed part 58 of the roof. When the container full of food product is placed in position, the door 56 is closed, and the duct 9 is lowered through the gland 27 to bring the flange 4 on the cover 3 into sealing engagement with the rim 5 on the container. The valve 10 is then opened. The injector tube 13 is lowered through a sealing gland 14 into the food product in the container in the manner illustrated in FIG. 1c and the sterilization process is carried out.

Meanwhile the duct 29 is opened and steam under pressure is admitted into the chamber 15. The steam feed is continued until sterile conditions are achieved within the chamber 15 which is then maintained under steam pressure throughout the sterilization operation. When sterilization and cooling is complete the valve 10 is closed, the tube 13 and the duct 9 are raised to release the cover 3 from the container 2. The container 2 full of a sterile mixture of food product in a liquid, for example its own juice, is then moved, by means of the conveyor 57 to a position beneath a capping apparatus 30.

When the lid has been sealed onto the container, this being effected in the aseptic conditions prevailing within the chamber 15, the valved pipe 29 is closed and the pipe 59 is opened to release steam pressure inside the chamber 15. The door is opened and by means of the conveyor 57 the sealed container of sterile food product is removed.

The plant is then ready for another operation.

The many variants of the method and apparatus according to the invention which have been described, permit the invention to be used for the sterilization and preservation of many different food products which are in whole pieces or cut into pieces or which are in the form of liquid pulp or concentrated pulp, and which are sealed and preserved in a large container in which they are sterilized and cooled or are sterilized and cooled under aseptic conditions in a separate chamber and loaded gently into and sealed into a large and transportable container, thereby ensuring that appearance, quality and flavour of the product are maintained in the bulk processing.

I claim:

1. A method of preserving a food product comprising the steps of:
    placing a body of food product in a container in which it is ultimately sealed;
    placing the container in a sealed chamber;
    capping the container with a cover;
    admitting steam into the sealed chamber to create and maintain sterile conditions therein;
    lowering an injector tube through the cover into the product in the container;
    feeding a hot fluid through the tube into the product to sterilize the product;
    cooling the product in the container;
    retaining a predetermined amount of liquid in admixture with the sterile product in the container;
    withdrawing the injector tube and the cover;
    sealing the container while it is within the aseptic environment in the chamber; and then
    opening the chamber to remove the sealed container of sterile product.

2. A method as claimed in claim 1, comprising flash cooling the sterile product by exhausting said hot fluid therefrom.

3. A method of preserving a food product comprising the steps of:
    inserting into a retracted lower part of a sealable enclosure, a sealable container containing a body of a food product, which lower part substantially encloses and supports said container;
    sealing the enclosure by raising said lower part into sealing engagement with the apertured floor of a fixed upper part of said enclosure;
    admitting steam into the sealed enclosure to create and maintain aseptic conditions therein;
    sterilizing the body of food product in the container with a fluid;
    sealing the container within the aseptic environment within the sealed enclosure; and then
    unsealing the enclosure by lowering said lower part of said enclosure and the sealed container therein.

4. A method according to claim 3, comprising sterilizing the product by feeding a hot fluid into the body of food product in the container, and removing excess liquid from the sterile product so that the sterile product sealed in the container is mixed in a desired proportion with the liquid.

5. A method as claimd in claim 3, comprising sterilizing the body of food product in the container by capping the container containing the product with a cover, lowering an injector tube through the cover into the product in the container, feeding a hot fluid through the tube into the bottom of the container, and when the product in the container is sterile and cooled, withdrawing the cover and tube prior to sealing the container within the aseptic environment.

6. A method of preserving a food product comprising the steps of:
    feeding a body of the food product to be sterilized into a sealable container;
    inserting the container with the product into a retracted lower part of a sealable enclosure;
    sealing the enclosure by raising said lower part, which substantially encloses and supports said container, into sealing engagement with the apertured floor of a fixed upper part of said enclosure;

admitting steam into the sealed enclosure to create and maintain aseptic conditions therein;

capping the container with a cover;

lowering an injector tube through the cover into the product in the container;

sterilizing the product by feeding a hot fluid through the injector tube into the product;

retaining a predetermined amount of liquid in admixture with the sterile product in the container;

removing the cover and the injector tube;

sealing the container in the aseptic environment within the sealed enclosure; and then unsealing the enclosure by lowering said lower part of the enclosure and the sealed container enclosed therein.

7. A method as claimed in claim 6, comprising flash cooling the sterile product by exhausting said hot fluid therefrom.

* * * * *